United States Patent
Suzuki et al.

(10) Patent No.: US 8,449,797 B2
(45) Date of Patent: May 28, 2013

(54) METHOD OF MANUFACTURING RETARDATION FILM

(75) Inventors: Shinya Suzuki, Miyagi (JP); Mitsunari Hoshi, Miyagi (JP)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 13/173,133

(22) Filed: Jun. 30, 2011

(65) Prior Publication Data

US 2012/0007275 A1    Jan. 12, 2012

(30) Foreign Application Priority Data

Jul. 8, 2010   (JP) ................................. 2010-155604

(51) Int. Cl.
*B29D 7/01*   (2006.01)
*B29C 33/40*   (2006.01)

(52) U.S. Cl.
USPC ............. 264/1.6; 264/1.7; 264/1.34; 264/2.5; 264/219; 264/220

(58) Field of Classification Search
None
See application file for complete search history.

(56) References Cited

U.S. PATENT DOCUMENTS

| 7,969,541 B2 * | 6/2011 | Okuyama et al. ............. 349/117 |
| 8,257,621 B2 * | 9/2012 | Sasada .......................... 264/1.34 |
| 8,349,228 B2 * | 1/2013 | Kazama ......................... 264/1.6 |
| 2009/0174097 A1 * | 7/2009 | Tsai et al. .................... 264/1.34 |

FOREIGN PATENT DOCUMENTS

JP   2000-221461   8/2000

* cited by examiner

*Primary Examiner* — Mary F Theisen
(74) *Attorney, Agent, or Firm* — K&L Gates LLP

(57) ABSTRACT

A method of manufacturing a retardation film includes: a first step of forming, on the same metal master, a main region having several kinds of groove regions having different extending directions of grooves, and a sub region having one kind of groove region having a predetermined extending direction of grooves or several kinds of groove regions having different extending directions of grooves; and a second step of collectively transferring reverse patterns of the main and sub regions on the metal master to a base, and then forming, on a surface of the base, a layer including an alignable material to be aligned in correspondence to irregularity of the surface of the base, thereby forming a patterned retardation region in a site having a reverse pattern of the main region, and forming an alignment mark region in a site having a reverse pattern of the sub region.

6 Claims, 16 Drawing Sheets

METHOD OF MANUFACTURING RETARDATION FILM

CROSS REFERENCES TO RELATED APPLICATIONS

The present application claims priority to Japanese Priority Patent Application JP 2010-155604 filed in the Japan Patent Office on Jul. 8, 2010, the entire content of which is hereby incorporated by reference.

BACKGROUND

The present application relates to a method of manufacturing a retardation film using an alignable material such as liquid crystal.

Recently, a display capable of three-dimensional display has been increasingly developed. A three-dimensional display method includes, for example, a method where a right-eye image and a left-eye image are displayed on a display screen, and the images are viewed by a viewer wearing polarized glasses (for example, see Japanese Unexamined Patent Application Publication No. 2000-221461 (JP-A-2000-221461)). The method is achieved by disposing a patterned retardation film on a front surface of a display capable of two-dimensional display, for example, a cathode-ray tube, a liquid crystal display, or a plasma display. The retardation film is patterned in retardation or optical axis at a display pixel level in order to control a polarization state of light entering into respective two eyes.

When the retardation film is attached to a display panel or to a black stripe film, accurate alignment is necessary. When the retardation film is manufactured of a roll base, the roll base needs to be accurately aligned to a punching machine. In the former case, each of the retardation film and the display panel or black stripe film is typically put with an alignment mark to achieve such alignment. In the latter case, typically, the roll base is put with an alignment mark, and a marker sheet is disposed on an optical path of a detection camera. A method of forming the alignment mark on an object conceivably includes, for example, a method where an alignment mark is added on a produced object by evaporation or printing, or a method where an object is produced of a marked member (see JP-A-2000-221461).

SUMMARY

However, when the method according to JP-A-2000-221461 is used for attaching the retardation film to the display panel or the like, a retardation region of the retardation film is formed in a separate step from formation of the alignment mark. It is therefore necessary to perform accurate positioning of one while recognizing a position of the other in order to improve alignment accuracy. This has disadvantageously resulted in a complicated manufacturing process or increase in number of steps.

It is desirable to provide a method of manufacturing a retardation film, allowing improvement in alignment accuracy with a simple method and in a small number of steps.

A method of manufacturing a retardation film according to an embodiment includes the following two steps:

(A) a first step of forming, on the same metal master, a main region having several kinds of groove regions having different extending directions of grooves, and a sub region having one kind of groove region having a predetermined extending direction of grooves or several kinds of groove regions having different extending directions of grooves; and (B) a second step of collectively transferring reverse patterns of the main and sub regions on the metal master to a base, and then forming, on a surface of the base, a layer including an alignable material to be aligned in correspondence to irregularity of the surface of the base, thereby forming a patterned retardation region in a site having a reverse pattern of the main region, and forming an alignment mark region in a site having a reverse pattern of the sub region.

In the method of manufacturing a retardation film according to the embodiment, irregularities of both the patterned retardation region and the alignment mark region of the retardation film are collectively formed by transfer using the metal master. Both the irregularities are thus formed in one step in the embodiment.

In the method of manufacturing a retardation film according to the embodiment, the sub region on the metal master may be configured of groove regions having extending directions of grooves different from extending directions of grooves in the main region on the metal master, or may be conversely configured of groove regions having the same extending directions of grooves as the extending directions of grooves in the main region on the metal master. In addition, in the method of manufacturing a retardation film according to the embodiment, the base may include an uncured energy-curing resin layer formed on a surface of a flexible film, or may be configured of a flexible single-layer film or a flexible multilayer film. In addition, in the first step of the method of manufacturing a retardation film according to the embodiment, a surface of the metal master may be irradiated with ultrashort pulse laser (for example, femtosecond laser), be polished by grinding particles, or be ground by a bite to form the main and sub regions.

The retardation film manufactured by the above manufacturing method includes, for example, a patterned retardation region including several kinds of retardation regions having different alignment directions and an alignment mark region having the same alignment directions as the alignment directions of the retardation regions. The alignment mark region includes, for example, a mark region having the same alignment direction as one kind of alignment direction of the retardation regions, and a mark surrounding region adjacent to the mark region, the mark surrounding region having the same alignment direction as another kind of alignment direction of the retardation regions.

Alternatively, the retardation film manufactured by the above manufacturing method includes, for example, a patterned retardation region including several kinds of retardation regions having different alignment directions and an alignment mark region having alignment directions different from the alignment directions of the retardation regions. The alignment mark region includes, for example, a mark region having an alignment direction different from the alignment directions of the retardation regions, and a mark surrounding region adjacent to the mark region, the mark surrounding region having an alignment direction different from the alignment directions of the retardation regions and from the alignment direction of the mark region.

For example, the alignment mark region is to know a position of the retardation region indirectly in attaching the retardation film to a display panel, in attaching the retardation film to a black stripe, or in punching a roll base by a punching machine when the retardation film is manufactured of the roll base.

According to the method of manufacturing the retardation film of the embodiment, since irregularities of both the patterned retardation region and the alignment mark region of the retardation film are formed in one step, alignment accuracy may be improved with a simple method and in a small number of steps.

In the method of manufacturing the retardation film according to the embodiment, when the sub region on the metal master is configured of groove regions having extending directions of grooves different from extending directions of grooves in the main region on the metal master, the main and sub regions may be manufactured in a small number of steps. In the method of manufacturing the retardation film according to the embodiment, when the sub region on the metal master is configured of groove regions having the same extending directions of grooves as the extending directions of grooves in the main region on the metal master, when predetermined polarized-light is entered into a retardation film manufactured using such a metal master, light intensity or an emission color of emission light from the patterned retardation region may be made different from that of emission light from the alignment mark region. This makes it possible to detect the alignment mark region automatically by an automatic detector at low error rate by using difference in light intensity or emission color between the regions.

It is to be understood that both the foregoing general description and the following detailed description are exemplary, and are intended to provide further explanation of the technology as claimed.

Additional features and advantages are described herein, and will be apparent from the following Detailed Description and the figures.

DETAILED DESCRIPTION

Embodiments of the present application will be described below in detail with reference to the drawings.

1. First Embodiment (FIGS. 1 to 13)
Example where a retardation region and an alignment mark region have different alignment directions
2. Application Example (FIGS. 14 and 15)
Example where a detector in the first embodiment is used for attaching a retardation film to a black stripe film
3. Second Embodiment (FIGS. 16 to 18)
Example where a retardation region and an alignment mark region have the same alignment directions 1. First Embodiment Configuration of Retardation Film 10

Figure 1:
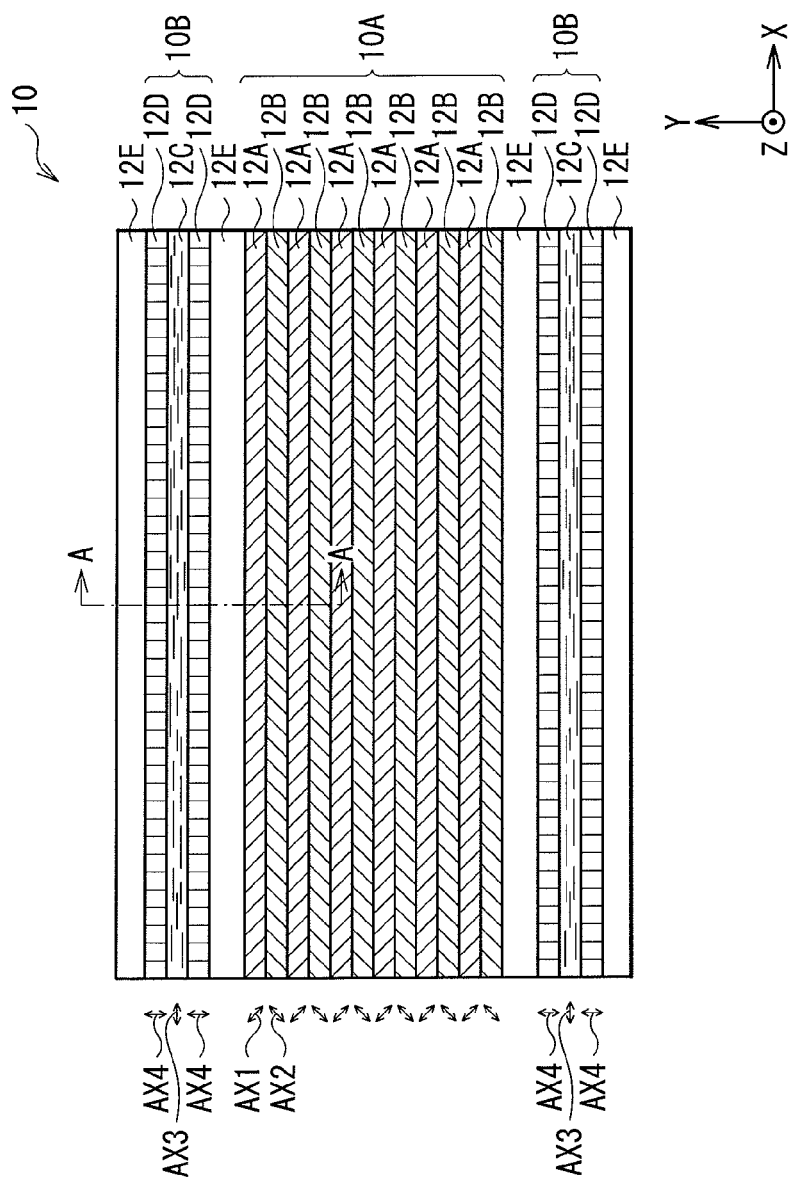
FIG. 1 is a diagram illustrating an example of a top configuration of a retardation film according to a first embodiment.
Figure 2A:
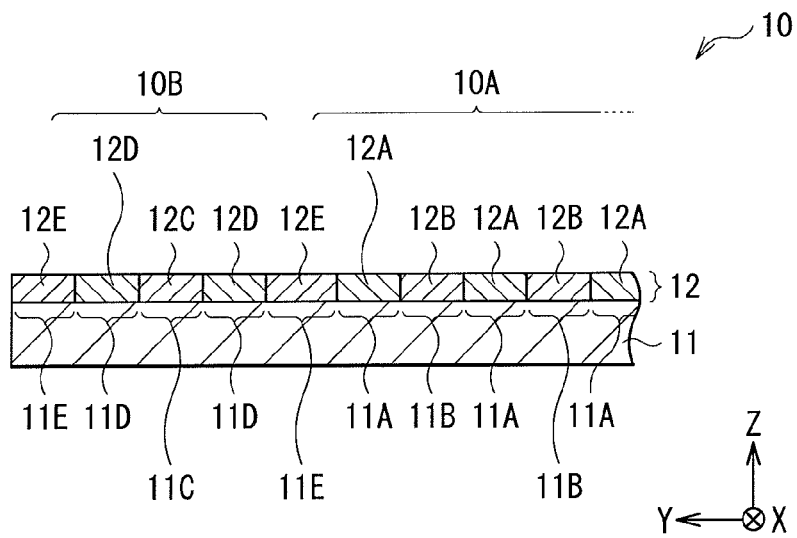
FIG. 2A is a diagram illustrating an example of a sectional configuration in an A-A arrow direction of the retardation film of FIG. 1.
Figure 2B:
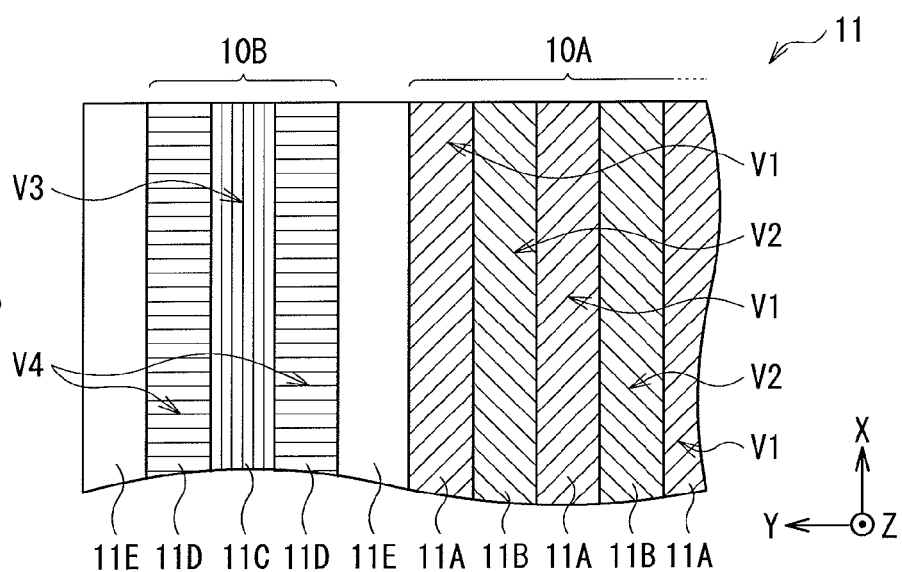
FIG. 2B is a diagram illustrating an example of a top configuration of a substrate in FIG. 2A.

FIG. 1 illustrates an example of a top configuration of a retardation film 10 according to a first embodiment. FIG. 2A illustrates an example of a sectional configuration in an A-A arrow direction of the retardation film 10 of FIG. 1. FIG. 2B illustrates a top view of a substrate 11 in FIG. 2A. The retardation film 10 has a patterned retardation region 10A disposed at a position opposed to a display pixel region when the retardation film 10 is used for 3D display, and an alignment mark region 10B disposed along an edge of the patterned retardation region 10A.

A top of the retardation film 10 has a flat region (non-alignment region 12E described later) in which the patterned retardation region 10A and the alignment mark region 10B are not formed. For example, the flat region is formed between the patterned retardation region 10A and the alignment mark region 10B as shown in FIG. 1.

The retardation film 10 includes, for example, the substrate 11 and a retardation layer 12 formed in contact with a surface of the substrate 11 as shown in FIG. 2A. The substrate 11 has groove regions 11A and 11B in a surface in the patterned retardation region 10A, and has groove regions 11C and 11D in a surface in the alignment mark region 10B. A flat region (flat region 11E), in which the patterned retardation region 10A and the alignment mark region 10B are not formed, is also provided in the top face of the substrate 11. For example, the flat region 11E is formed between the patterned retardation region 10A and the alignment mark region 10B as shown in FIGS. 2A and 2B.

The substrate 11, which supports the retardation layer 12, is configured of, for example, a transparent resin film. For example, the substrate 11 is preferably small in optical anisotropy, namely, small in birefringence. A transparent resin film having such a property includes, for example, TAC (triacetyl-cellulose), COP (cycloolefin polymer), COC (cycloolefin copolymer), or PMMA (polymethylmethacrylate). COP includes, for example, ZEONOR or ZEONEX (registered trademark of ZEON CORPORATION) or ARTON (registered trademark of JSR Corporation). Thickness of the substrate 11 is, for example, 30 to 500 µm both inclusive.

Figure 3:
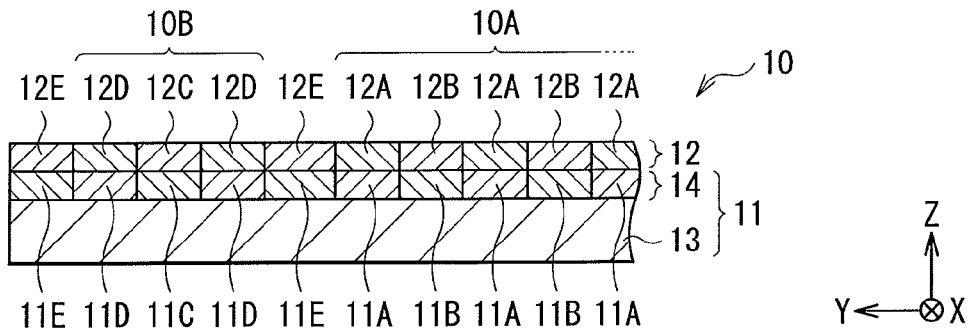
FIG. 3 is a diagram illustrating another example of the substrate of FIG. 2B.

For example, the substrate 11 may have a single-layer structure or a multi-layer structure. When the substrate 11 has a multi-layer structure, the substrate 11 has, for example, a two-layer structure where a resin layer 14 is formed on a surface of a base 13 as shown in FIG. 3. The resin layer 14 is substantially free from light absorption or coloring unlike an optical alignment film or a polyimide alignment film. FIG. 3 illustrates a case where the groove regions 11A and 11B are patterned in the resin layer 14 formed as a top layer of the substrate 11.

For example, the groove regions 11A and 11B each have a stripe pattern, and are alternately arranged in a surface of the substrate 11. For example, each stripe width is the same as a pixel pitch of a display device. The groove region 11A is configured of a plurality of grooves V1. Width of each groove V1 is, for example, several hundred nanometers, and depth of each groove V1 is, for example, several hundred nanometers. The grooves V1 extend along the same direction d1 (not shown). The groove region 11B is configured of a plurality of grooves V2. Width of each groove V2 is, for example, several hundred nanometers, and depth of each groove V2 is, for example, several hundred nanometers. The grooves V2 extend along the same direction d2 (not shown). For example, the directions d1 and d2 are orthogonal to each other.

For example, the groove regions 11C and 11D each have a stripe pattern. The groove region 11C is surrounded by the groove region 11D along all or part of an outer edge of the groove region 11C. For example, the groove region 11C is formed (in a gap) between a pair of groove regions 11D, as shown in FIG. 2B. For example, stripe widths in the groove regions 11C and 11D are the same as stripe widths in the groove regions 11A and 11B, respectively. The groove region 11C is configured of a plurality of grooves V3. Width of each groove V3 is, for example, several hundred nanometers, and depth of each groove V3 is, for example, several hundred nanometers. The grooves V3 extend along the same direction d3 (not shown). The groove region 11D is configured of a plurality of grooves V4. Width of each groove V4 is, for example, several hundred nanometers, and depth of each groove V4 is, for example, several hundred nanometers. The grooves V4 extend along the same direction d4 (not shown). For example, the directions d3 and d4 are orthogonal to each other.

The retardation layer 12 has retardation regions 12A and 12B in a surface in the patterned retardation region 10A, and has a mark region 12C and mark surrounding regions 12D in the surface in the alignment mark region 10B. The retardation layer 12 further has a flat region (non-alignment region 12E) in which the patterned retardation region 10A and the alignment mark region 10B are not formed. The non-alignment region 12E is substantially free from retardation, and, for example, formed between the patterned retardation region 10A and the alignment mark region 10B as shown in FIGS. 1 and 2A.

For example, the retardation regions 12A and 12B each have a stripe pattern, and are alternately arranged in the patterned retardation region 10A. For example, stripe width in each retardation region is the same as a pixel pitch of a display device. The retardation regions 12A are provided opposite to the groove regions 11A, and the retardation regions 12B are provided opposite to the groove regions 11B. The retardation regions 12A and 12B have different retardation characteristics. Specifically, each retardation region 12A has a slow axis AX1 in an extending direction d1 of the grooves V1, and each retardation region 12B has a slow axis AX2 in an extending direction d2 of the grooves V2. For example, the slow axes AX1 and AX2 are orthogonal to each other. For example, retardation of the retardation region 12A is $-\lambda/4$, and retardation of the retardation region 12B is $+\lambda/4$. The different signs of retardation show that directions of the slow axes are different by 90 degrees. The retardation regions 12A and 12B preferably have the same absolute value of retardation.

For example, the mark region 12C and the mark surrounding region 12D each have a stripe pattern. The mark region 12C is surrounded by the mark surrounding region 12D along all or part of an outer edge of the mark region 12C. For example, the mark region 12C is formed (in a gap) between a pair of mark surrounding regions 12D as shown in FIG. 1. For example, respective stripe widths in the mark region 12C and the mark surrounding region 12D are the same as respective stripe widths in the retardation regions 12A and 12B. The mark region 12C and the mark surrounding region 12D have different retardation characteristics. Furthermore, respective retardation characteristics of the mark region 12C and the mark surrounding region 12D are different from respective retardation characteristics of the retardation regions 12A or 12B. Specifically, the mark region 12C has a slow axis AX3 in an extending direction d3 of the grooves V3, and the mark surrounding region 12D has a slow axis AX4 in an extending direction d4 of the grooves V4. For example, the slow axes AX3 and AX4 are orthogonal to each other, and are in directions different from those of the slow axes AX1 and AX2 in the patterned retardation region 10A, respectively. For example, retardation of the mark region 12C is equal to retardation of the retardation region 12A (for example, $-\lambda/4$), and retardation of the mark surrounding region 12D is equal to retardation of the retardation region 12B (for example, $+\lambda/4$). The mark region 12C and the mark surrounding region 12D preferably have the same absolute value of retardation.

For example, the retardation layer 12 is configured of a polymerized, polymer liquid crystal material. That is, an alignment state of liquid crystal molecules is fixed in the retardation layer 12. As the polymer liquid crystal material, a material is selected and used depending on phase-transition temperature (liquid crystal phase to isotropic phase), a refractive-index wavelength-dispersion characteristic of a liquid crystal material, a viscosity characteristic, and process temperature. However, the polymer liquid crystal material preferably has an acryloyl group or a methacryloyl group as a polymerizable group from the viewpoint of transparency. In addition, a material free from methylene spacer between a polymerizable functional-group and a liquid crystal skeleton is preferably used as the polymer liquid crystal material. This is because such a material allows alignment treatment temperature to be lowered during a process. Thickness of the retardation layer 12 is, for example, 1 to 2 µm both inclusive. When the retardation layer 12 is configured of a polymerized, polymer liquid crystal material, the retardation layer 12 need not be configured of the polymerized, polymer liquid crystal material only, and may partially contain unpolymerized liquid-crystalline monomer. This is because the unpolymerized liquid-crystalline monomer in the retardation layer 12 are aligned in the same direction as an alignment direction of liquid crystal molecules around the monomer, and therefore have the same alignment characteristic of the polymer liquid crystal material.

For example, long axes of liquid crystal molecules are arranged along the extending direction d1 of the grooves V1 near a boundary between the groove region V1 and the retardation region 12A. In addition, for example, liquid crystal molecules in an upper part of the retardation region 12A are also arranged along the direction d1 in accordance with the alignment direction of liquid crystal molecules in a lower part of the retardation region 12A. That is, in the retardation region 12A, for example, alignment of liquid crystal molecules is controlled and besides an optical axis of the retardation region 12A is set depending on a shape of the groove V1 extending in the direction d1. The same is true for each of the retardation region 12B, the mark region 12C, and the mark surrounding region 12D.

Method of Manufacturing Substrate 11

Next, an example of a method of manufacturing a master for manufacturing the substrate 11 will be described.

FIGS. 4A to 4E illustrate an example of a procedure for drawing a pattern on a roll master 100. For example, the roll master 100 is configured of metal such as stainless steel, Ni, Cu, Al, or Fe. Ultrashort pulse laser having a pulse width of 1 picosecond (10-12 second) or less, so-called femtosecond laser, is used for pattern drawing.

Linearly polarized light is used for laser light. For example, a polarization direction of the laser light may be adjusted by placing a polarizing plate (half-wave plate) on an optical path and rotating a polarization direction of the polarizing plate. A wavelength of the laser light is, for example, 800 nm. However, the wavelength of the laser light may be 400 nm or 266 nm. Repetition frequency is preferably high in consideration of processing time. However, even if the repetition frequency is 1000 or 2000 Hz, processing may be performed. Pulse width is preferably short, about 200 femtoseconds ($10^{-15}$ second) to 1 picosecond ($10^{-12}$ second). The roll master 100 is preferably irradiated with laser having a beam spot Lp having a quadrilateral shape. For example, the beam spot may be shaped by an aperture or a cylindrical lens.

Figure 4A:
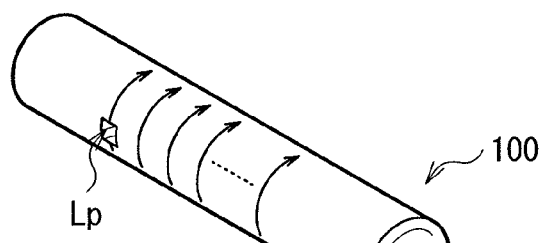
FIGS. 4A to 4E are diagrams explaining an example of a method of manufacturing a roll master used for manufacturing the substrate of FIG. 2B.
Figure 4B:
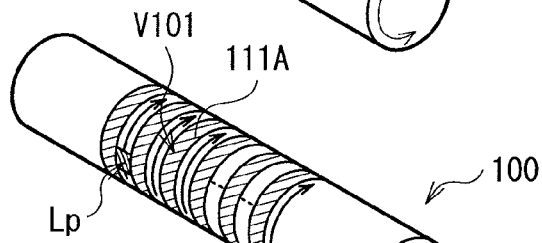
Figure 4C:
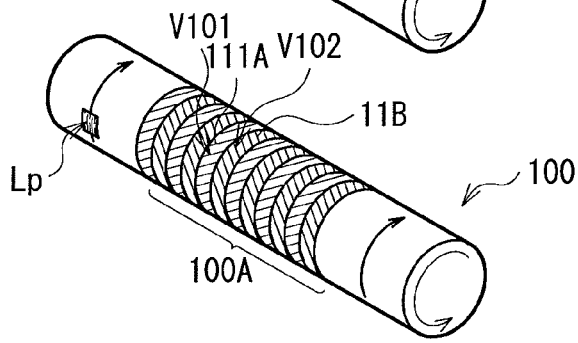

First, a circumferential surface of the roll master 100 is irradiated with laser light having a predetermined polarization direction while the roll master 100 is rotated (FIG. 4A). This results in formation of groove regions 111A (corresponding to a reverse pattern of the groove regions 11A) on the roll master 100, each region 111A including a plurality of grooves V101 extending in a direction orthogonal to the polarization direction (FIG. 4B). Next, the polarization direction is rotated by 90 degrees, and the circumferential surface of the roll master 100 is irradiated with laser light having a polarization direction different by 90 degrees from the previous polarization direction while the roll master 100 is rotated (FIG. 4B). This results in formation of groove regions 111B (corresponding to a reverse pattern of the groove regions 11B) on the roll master 100, each region 111B including a plurality of grooves V102 extending in a direction orthogonal to the polarization direction (FIG. 4C). As a result, a main region 100A is formed, in which two kinds of groove regions 111A and 111B having different extending directions of grooves are alternately arranged (FIG. 4C).

Figure 4D:
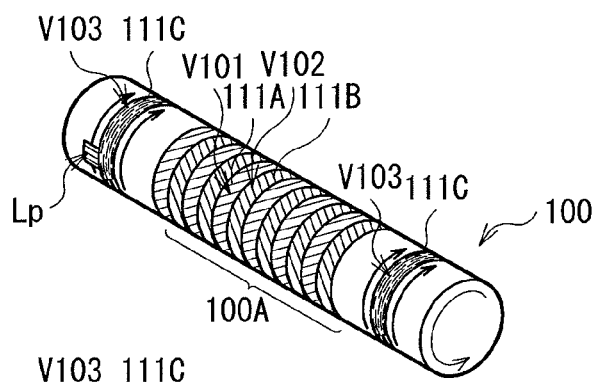
Figure 4E:
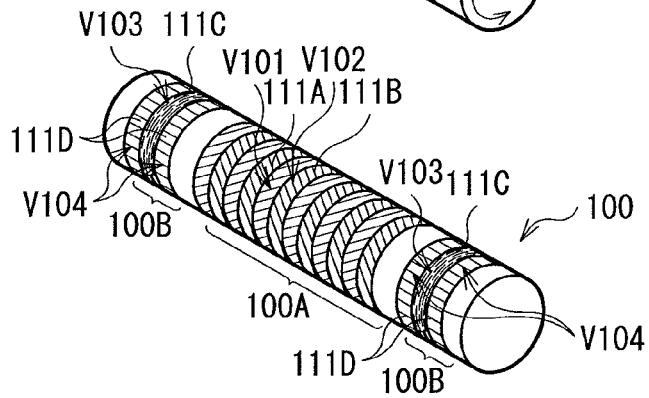

Next, the polarization direction is rotated by 45 degrees, and the circumferential surface of the roll master 100 is irradiated with laser light having a polarization direction different by 45 degrees from the previous polarization direction while the roll master 100 is rotated (FIG. 4C). This results in formation of a groove region 111C (corresponding to a reverse pattern of the groove region 11C) on the roll master 100, the region 111C including a plurality of grooves V103 extending in a direction orthogonal to the polarization direction (FIG. 4D). Next, the polarization direction is rotated by 90 degrees, and the circumferential surface of the roll master 100 is irradiated with laser light having a polarization direction different by 90 degrees from the previous polarization direction while the roll master 100 is rotated (FIG. 4D). This results in formation of a groove region 111D (corresponding to a reverse pattern of the groove region 11D) on the roll master 100, the region 111D including a plurality of grooves V104 extending in a direction orthogonal to the polarization direction (FIG. 4E). As a result, a sub region 100B is formed, in which two kinds of groove regions 111C and 111D having different extending directions of grooves are alternately arranged (FIG. 4E). Here, extending directions of the grooves V103 and V104 are different from extending directions of the grooves V101 and V102 in the main region 100A, respectively.

Formation order of the grooves V101 to V104 is not limited to the above, and other order may be used. For example, the grooves V101 and V102 to be formed in the main region 100A may be successively formed with no interval in such a manner that a first groove V101, a first groove V102, a second groove V101, and a second groove V102 . . . are sequentially formed. In addition, for example, the grooves V103 and V104 to be formed in the sub region 100B may be successively formed with no interval in such a manner that a first groove V104, a first groove V103, and a second groove V104 . . . are sequentially formed.

Method of Manufacturing Retardation Film 10

Next, an example of a method of manufacturing the retardation film 10 will be described. In the following, first, description is made on a case where a substrate 11' is manufactured by a so-called 2P molding method (Photo Polymerization: molding method using photo-curing), and then on a case where the substrate 11' is manufactured by a thermal transfer method. Then, description is made on a method of manufacturing the retardation film 10 using the substrate 11' manufactured by either of the above methods. The substrate 11' refers to a windable film substrate while including the same layer structure and the same material as those of the substrate 11.

Figure 5:
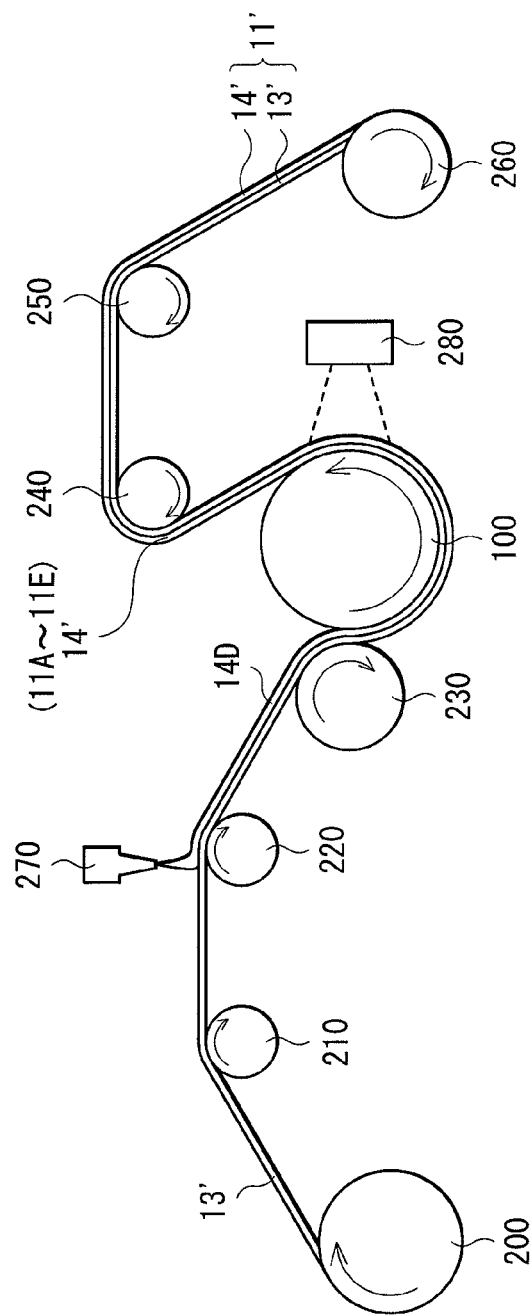
FIG. 5 is a diagram explaining an example of a method of manufacturing the retardation film of FIG. 1.

FIG. 5 illustrates an example of equipment for manufacturing the substrate 11' by the 2P molding method. In the 2P molding method, for example, a resin material to be cured by ultraviolet rays or electron beams is applied to a base to form a resin layer, and then a mold having a reverse pattern of a pattern of a groove region is pressed onto the resin layer. Then, the resin layer is irradiated with energy rays such as ultraviolet rays or electron beams and thus cured, thereby the mold pattern is transferred to a surface of the resin layer. In the following, description is made on a configuration of the manufacturing equipment illustrated in FIG. 5 and on a method of manufacturing the substrate 11 by the manufacturing equipment.

The manufacturing equipment illustrated in FIG. 5 includes an unwinding roll 200, guide rolls 210, 220, 240, and 250, a nip roll 230, a roll master 100, a winding roll 260, a discharger 270, and a UV irradiator 280. The unwinding roll 200 includes a concentrically wound film-base 13' and supplies the film base 13'. The base 13' refers to a windable, flexible film base while including the same layer structure and the same material as those of the base 13. The base 13' is unwound from the unwinding roll 200 and advances along the guide rolls 210 and 220, the nip roll 230, the roll master 100, and the guide rolls 240 and 250 in this order, and is finally wound by the winding roll 260. The guide rolls 210 and 220 guide the base 13' supplied from the unwinding roll 200 to the nip roll 230. The nip roll 230 presses the base 13' from the guide roll 220 to the roll master 100. The roll master 100 is disposed near the nip roll 230 with a predetermined gap in between. The reverse patterns (groove regions 111A to 111D) of the groove regions 11A to 11D are formed on a circumferential surface of the roll master 100. The guide roll 240 separates the base 13' wound on the roll master 100 from the roll master. The guide roll 250 guides the base 13' separated by the guide roll 240 to the winding roll 260. The discharger 270 is provided with a certain clearance near a portion, which is in contact with the guide roll 220, of the base 13' supplied from the unwinding roll 200. The discharger 270 drops a composition onto the base 13' to form a resin layer 14D, the composition including a liquid resin material, to which an additive such as a photopolymerization initiator is added as necessary, being cured by ultraviolet rays or electron beams. The UV irradiator 280 allows a portion, which has passed the nip roll 230 and is being in contact with the roll master 100, of the base 13' supplied from the unwinding roll 200 to be irradiated with ultraviolet rays.

The manufacturing equipment having such a configuration is used to form the substrate 11'. The substrate 11' refers to a windable, flexible film substrate while including the same layer structure and the same material as those of the substrate 11. Specifically, first, the base 13' unwound from the unwinding roll 200 is guided to the guide roll 220 via the guide roll 210, and then the component is dropped from the discharger 270 onto the base 13' so that the resin layer 14D (uncured energy-curing resin layer) is formed. Next, the resin layer 14D is pressed by the nip roll 230 against the circumferential surface of the roll master 100 with the base 13' in between. Consequently, the resin layer 14D contacts the circumferential surface of the roll master 100 without gap, and consequently an irregular pattern formed on the circumferential surface of the roll master 100 is transferred to the resin layer 14D.

Then, the resin layer 14D having the irregular pattern transferred thereto is irradiated with UV light from the UV irradiator 280. This causes polymerization of liquid-crystalline monomer in the resin layer 14D, forming a polymer liquid crystal with the polymerized liquid-crystalline monomer being aligned in an extending direction of the irregular pattern formed on the circumferential surface of the roll master 100. As a result, the resin layer 14 is formed on the base 13'. Finally, the base 13' is separated from the roll master 100 by the guide roll 240, and then wound on the winding roll 260 via the guide roll 250. In this way, the substrate 11 having the resin layer 14 on the base 13' is formed.

When the base 13' includes a material that hardly transmits UV light, the roll master 100 may be configured of a material (for example, quartz) that transmits UV light so that the resin layer 14 is irradiated with ultraviolet rays UV from the inside of the roll master 100.

Next, description is made on a process of manufacturing the substrate 11' by the thermal transfer method. First, the base 13' is heated to a temperature near a glass transition temperature. The base 13' may be heated through heating of the roll master 100 or heated by a certain heater. Next, the roll master 100 is pressed to a surface of the base 13', and then the base 13' is cooled and the roll master is released, so that the groove regions 11A to 11D are formed on a surface of the base 13'. In this way, the substrate 11' having the groove regions 11A to 11D on a surface thereof is formed.

Next, description is made on a method of manufacturing the retardation film 10' using the substrate 11' manufactured by the above method. The retardation film 10' refers to a windable film substrate while including the same layer structure and the same material as those of the retardation film 10.

Figure 6:
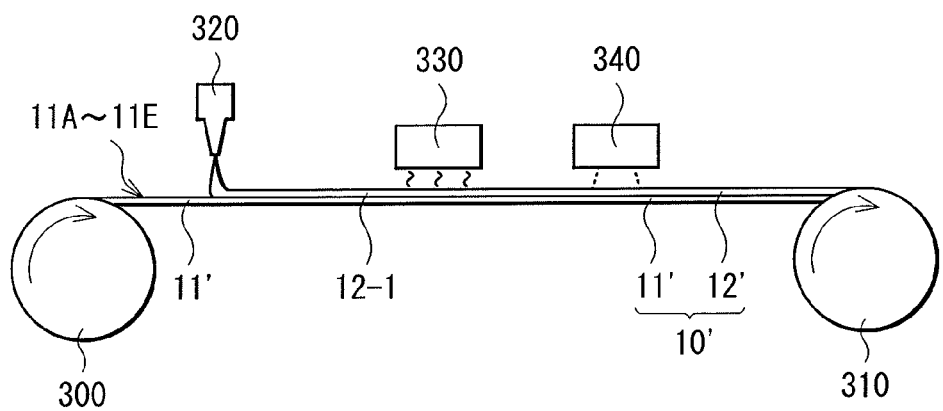
FIG. 6 is a diagram explaining an example of a method of manufacturing a retardation film using a substrate manufactured by the method of FIG. 5.

FIG. 6 illustrates a process of manufacturing the retardation film 10' using the substrate 11'. As shown in FIG. 6, a liquid crystal layer 12-1 including a liquid-crystalline monomer is formed by the discharger 320 on a surface of the substrate 11' having the groove regions 11A to 11D patterned thereon. Here, a polymer compound free from methylene spacer between a polymerizable functional-group and a liquid crystal skeleton is used for the liquid crystal layer 12-1, thereby the liquid crystal layer has a nematic phase near room temperature, making it possible to lower heating temperature in alignment treatment in a later step.

Here, solvent for dissolving the liquid-crystalline monomer, a polymerization initiator, a polymerization inhibitor, a surfactant, or a leveling agent is used for the liquid crystal layer 12-1 as necessary. While the solvent is not particularly limited, a solvent is preferably used, which highly dissolves the liquid-crystalline monomer, has a low vapor pressure at room temperature, and hardly evaporates at room temperature. This is because if a solvent that easily evaporates at room temperature is used, since evaporation rate of the solvent is too fast after the liquid crystal layer 12-1 is formed by coating, the liquid-crystalline monomer, formed after the solvent has evaporated, tends to be disorderedly aligned.

Next, alignment treatment (heating treatment) of the liquid-crystalline monomer in the liquid crystal layer 12-1 applied to the surface of the substrate 11' is performed. The heating treatment is performed at a temperature equal to or higher than the phase transition temperature of the liquid-crystalline monomer. In addition, when solvent is used, the heating treatment is performed at a temperature equal to or higher than drying temperature of the solvent, for example, 50 to 130° C. both inclusive. However, it is important to control rate of temperature rise, holding temperature, time, and rate of temperature decrease. For example, when the liquid crystal layer 12-1 including a liquid-crystalline monomer having a phase transition temperature of 52° C. is used, the monomer being dissolved in 1-methoxy-2-acetoxypropane (PGMEA) to obtain solid content of 30 wt %, first, the liquid crystal layer 12-1 is heated to a temperature, which is equal to or higher than the phase transition temperature (52° C.) of the liquid-crystalline monomer and is high enough for solvent to be dried, for example, about 70° C., and held at the temperature for about several minutes.

Shearing stress may be produced at a boundary between the liquid-crystalline monomer and the substrate due to coating of the liquid-crystalline monomer in a previous step, causing alignment by flow (flow-induced alignment) or alignment by external force (external-force-induced alignment), and consequently liquid crystal molecules may be aligned in an unintentional direction. The heating treatment is performed to temporarily cancel an alignment state of the liquid-crystalline monomer aligned in such an unintentional direction. This allows solvent to be dried from the liquid crystal layer 12-1, leading to only the liquid-crystalline monomer left in the liquid crystal layer, the monomer having a state of an isotropic phase.

Then, the liquid crystal layer 12-1 is gradually cooled to a temperature slightly lower than the phase transition temperature (52° C.), for example, 47° C., at a rate of about 1 to 5° C./min. The liquid crystal layer 12-1 is cooled to a temperature lower than the phase transition temperature in this way, which allows the liquid-crystalline monomer to be aligned in accordance with respective patterns of the groove regions 11A to 11D formed on the surface of the substrate 11'. That is, the liquid-crystalline monomer is aligned along the respective extending directions d1 to d4 of the grooves V1 to V4.

After the alignment treatment, the liquid crystal layer 12-1 is irradiated with UV light, for example, by a UV irradiator 340 so that the liquid-crystalline monomer is polymerized, as shown in FIG. 6. In such processing, while temperature is typically approximately room temperature, the temperature may be raised up to the phase transition temperature in order to adjust a retardation value. In addition, the liquid-crystalline monomer may be polymerized not only by UV light but also by heat or electron beams. However, use of UV light is advantageous in simplifying a process. Consequently, an alignment state of liquid crystal molecules is fixed along the respective directions d1 to d4, leading to formation of a liquid crystal layer 12' including retardation regions 12A and 12B, a mark region 12C, and a mark surrounding region 12D. This is the end of manufacturing of the retardation film 10' having the liquid crystal layer 12' on the substrate 11'.

Next, description will be made on a method of manufacturing the retardation film 10 from the retardation film 10' manufactured by the above method. In the following, manufacturing equipment of the retardation film 10 is first described, and a manufacturing process of the retardation film 10 is then described.

Figure 7:
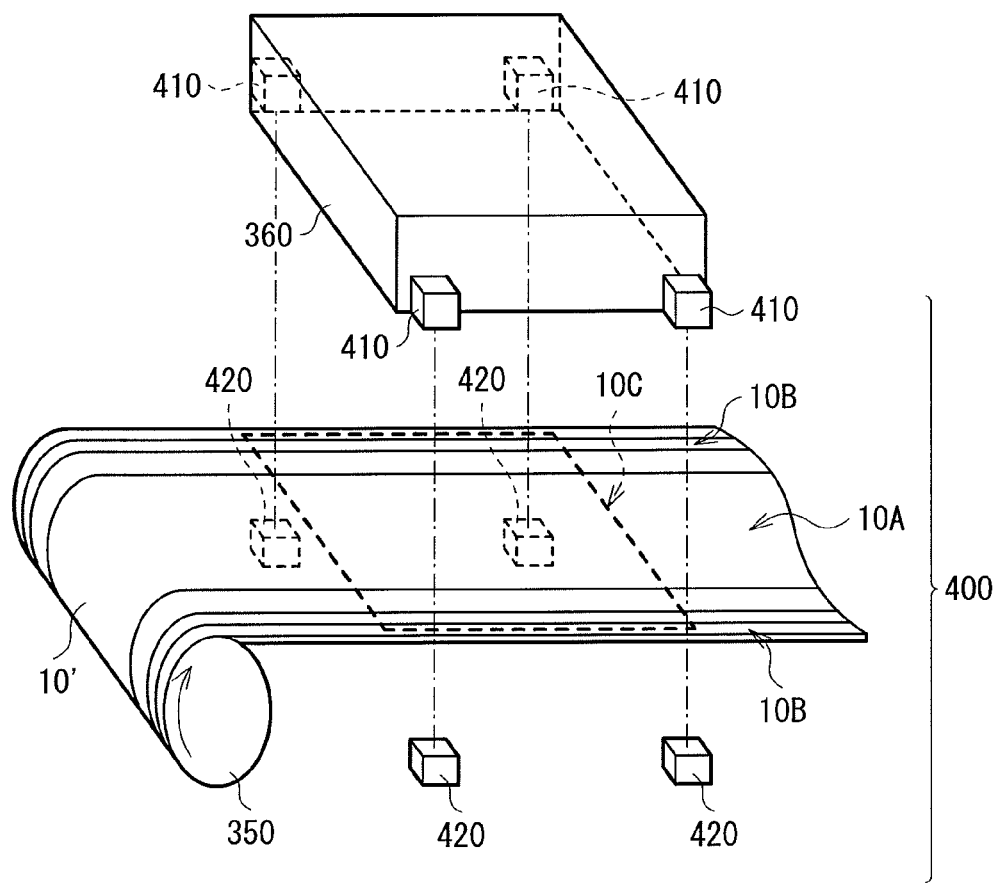
FIG. 7 is a diagram illustrating an example of a method of manufacturing a retardation film from the retardation film manufactured by the method of FIG. 6.

FIG. 7 illustrates an example of a configuration of the manufacturing equipment of the retardation film 10. The manufacturing equipment includes an unwinding roll 350 that unwinds the retardation film 10' and a punching machine 360 that punches the retardation film 10 from the retardation film 10'. For example, the punching machine 360 includes a blade (not shown) for punching a portion of the retardation film 10' just below the punching machine 360 and a support stage (not shown) for supporting the blade.

The manufacturing equipment further includes a stage (not shown) that adjusts a position of the punching machine 360 and a detector 400 that detects a position of the punching machine 360 with respect to the retardation film 10'.

For example, when an optimum position of the punching machine 360 is detected, the stage allows the punching machine 360 to scan in a direction orthogonal to an extending direction (moving direction) of the retardation film 10' and acquires an image captured by the detector 400, and derives the optimum position of the punching machine 360 from the acquired image. Furthermore, for example, when punching is performed, the stage sets the punching machine 360 to the optimum position, and then press the machine to the retardation film 10'.

Figure 8:
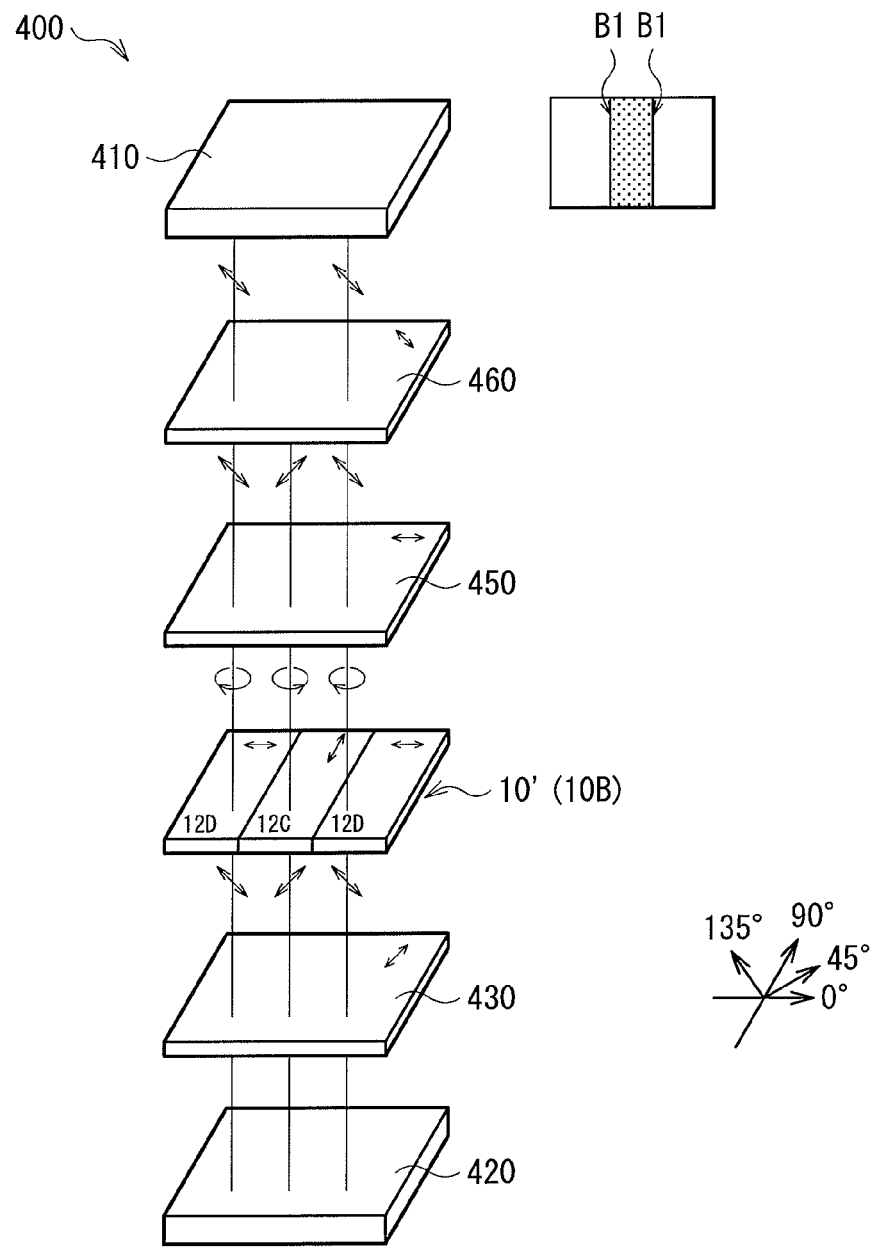
FIG. 8 is a diagram explaining a position detection system in the manufacturing method of FIG. 7.

The detector 400 includes, for example, a plurality of (four) cameras 410 fixed to the punching machine 360, and includes, for example, a light source 420, a polarizing plate 430, a λ/4 retardation film 450, and a polarizing plate 460 for each cameral 410, as shown in FIGS. 7 and 8. The light source 420, the polarizing plate 430, the λ/4 retardation film 450, and the polarizing plate 460 are disposed in at least an image pickup area of the camera 410, and disposed in this order toward the punching machine 360.

The retardation film 10' is disposed between the polarizing plate 430 and the λ/4 retardation film 450. For example, the light source 420 and the polarizing plate 430 are fixed just below the retardation film 10', for example, just below an alignment mark region 10B of the retardation film 10'. For example, the λ/4 retardation film 450 and the polarizing plate 460 move together with the camera 410 and the punching machine 360 in the direction orthogonal to the extending direction (moving direction) of the retardation film 10'. For example, the λ/4 retardation film 450 and the polarizing plate 460 are fixed on a lens (not shown) of the camera 410.

For example, the camera 410 is configured of a CMOS (Complementary Metal Oxide Semiconductor) image sensor or a CCD (Charge Coupled Device) image sensor. For example, the light source 420 outputs non-polarized white light. The polarizing plate 430 transmits a polarization component in a predetermined direction (for example, 45-degree direction). The λ/4 retardation film 450 has a slow axis in a predetermined direction (for example, 0-degree direction). The polarizing plate 460 transmits a polarization component in a predetermined direction (for example, 135-degree direction).

The manufacturing equipment having such a configuration is used to form the retardation film 10. Specifically, first, the retardation film 10' is unwound from the unwinding roll 350 and moves in the extending direction of the retardation film 10'. Concurrently, each camera 410 is allowed to scan in a direction orthogonal to the extending direction of the retardation film 10', and, for example, an image pickup area of each camera 410 traverses a region including the alignment mark region 10B of the retardation film 10' and edges of the patterned retardation region 10A of the retardation film 10'.

Figure 9:
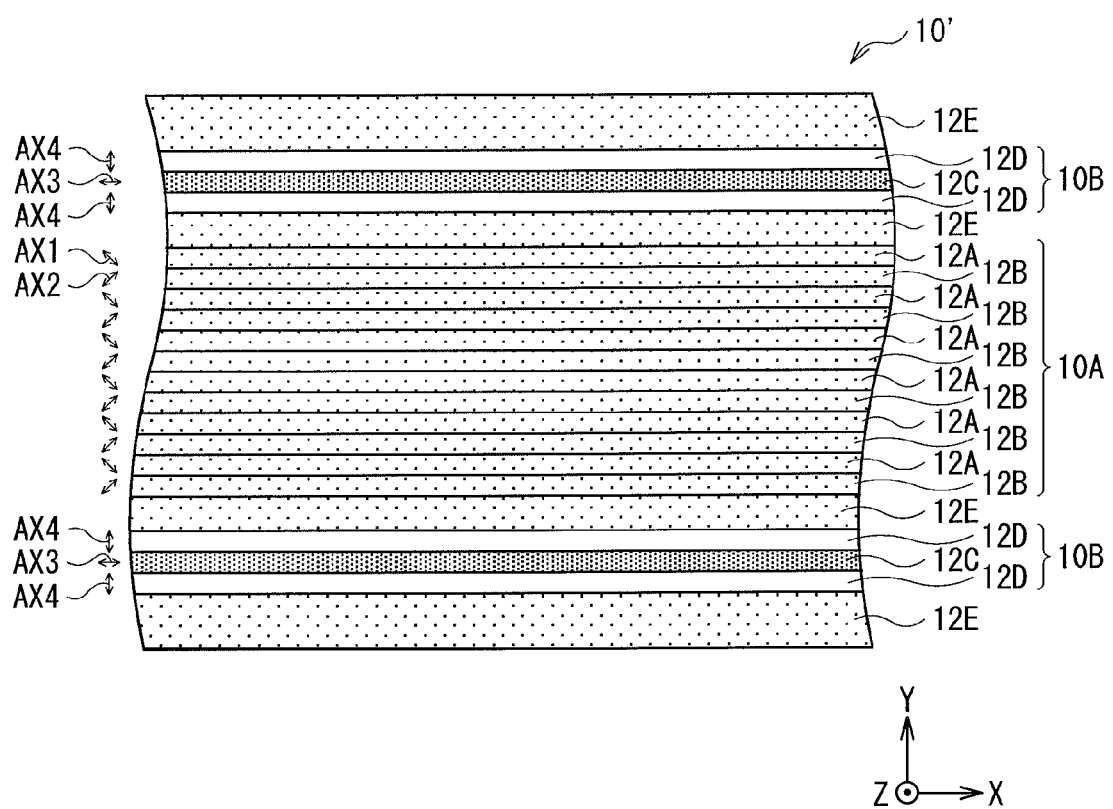
FIG. 9 is a diagram illustrating an example of a black-and-white pattern observed when the retardation film is viewed from above in a manufacturing process of FIG. 7.

Here, each camera 410 may detect an image of the retardation film 10', for example, an image as shown in FIG. 9. Specifically, the mark region 12C of the alignment mark region 10B is black, and the mark surrounding region 12D thereof is white. In addition, the retardation film 10' is gray outside the alignment mark regions 10B. This leads to high contrast at a boundary between the mark region 12C and the mark surrounding region 12D, and low contrast in other portions. Accordingly, (two) boundaries B1 between the mark region 12C and the mark surrounding regions 12D are detected (see an upper right figure of FIG. 8) from an image captured during scan of each camera 410 in the direction orthogonal to the extending direction of the retardation film 10', and furthermore a relative positional relationship of each camera 410 to the alignment mark region 10B is derived from the image. The optimum position of the punching machine 360 is derived from the positional relationship obtained in such a way, and the punching machine 360 is thus disposed at the optimum position. Then, the punching machine 360 is pressed to the retardation film 10' to punch the film 10'. In this way, the retardation film 10 is formed from the retardation film 10'.

Advantage

Next, an advantage of the method of manufacturing the retardation film 10 will be described in contrast to a method of manufacturing a retardation film according to a comparative example or to a method in the past.

Figure 10:
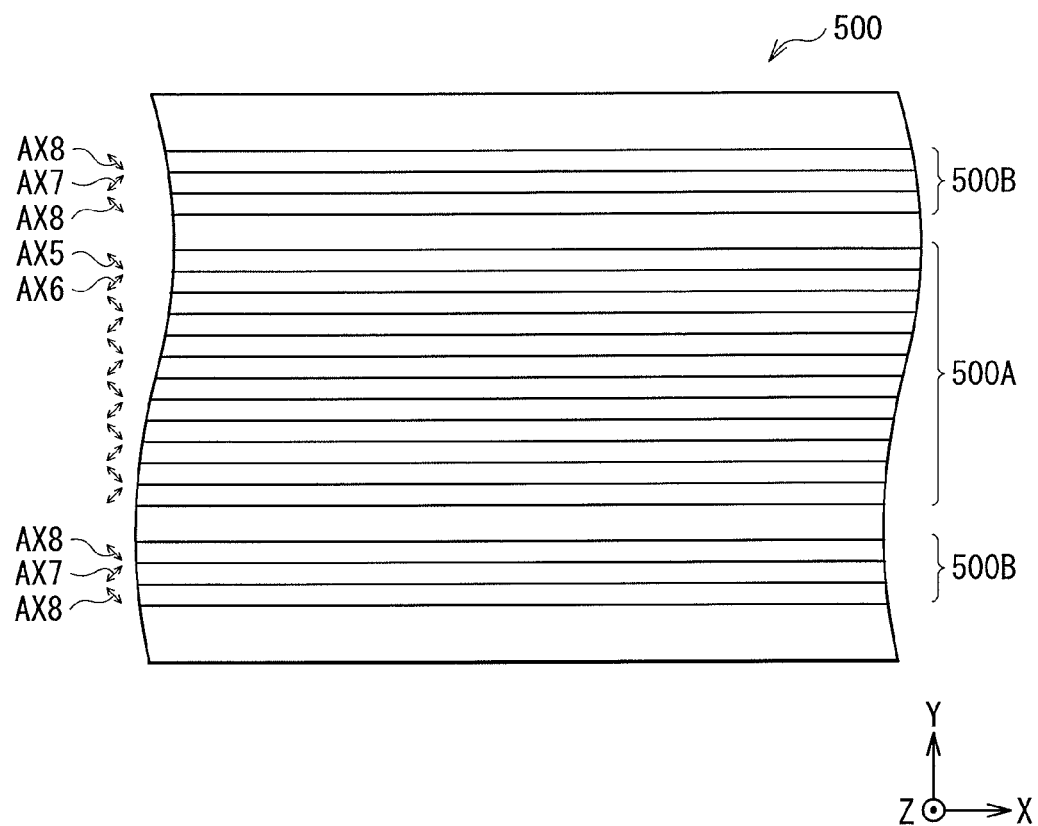
FIG. 10 is a diagram illustrating an example of a top configuration of a retardation film according to a comparative example.

FIG. 10 illustrates an example of a top configuration of a retardation film 500 according to a comparative example. The retardation film 500 has a patterned retardation region 500A in the center and an alignment mark region 500B near either edges in the same way as the retardation film 10'. In the patterned retardation region 500A, two kinds of strip-shape regions having slow axes AX5 and AX6 different in direction are alternately arranged. The alignment mark region 500B has two kinds of strip-shape regions disposed therein, the strip-shape regions having slow axes AX7 and AX8 in the same directions as those of the slow axes AX5 and AX6 in the patterned retardation region 500A, respectively.

Figure 11:
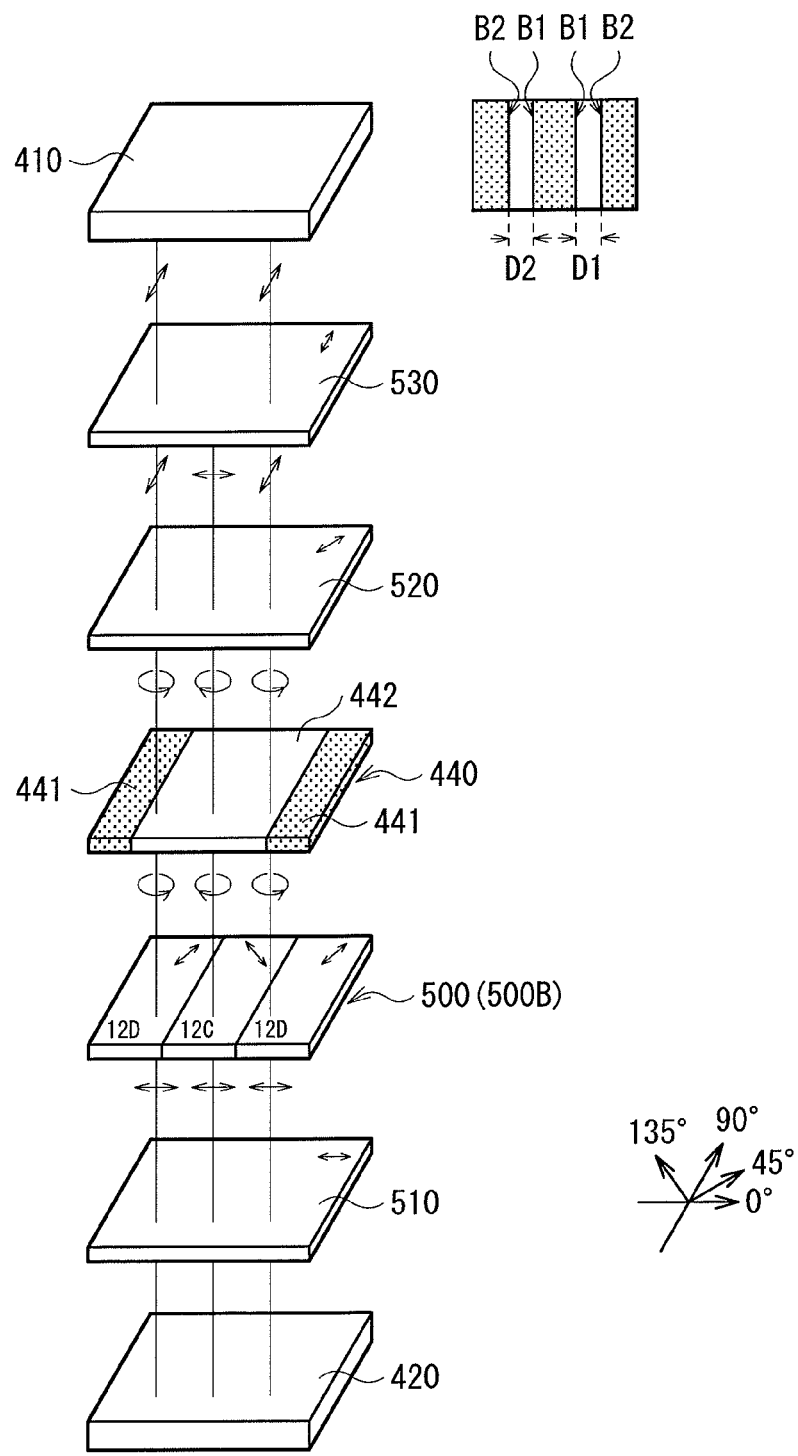
FIG. 11 is a diagram explaining a position detection system used when a retardation film according to the comparative example is manufactured from the retardation film of FIG. 10.

FIG. 11 illustrates a schematic configuration of a detector included in manufacturing equipment of a retardation film according to the comparative example. For example, the detector in the manufacturing equipment includes a plurality of (four) cameras 410 fixed to a punching machine 360, and, for example, includes a light source 420, a polarizing plate 510, a marker sheet 440, a λ/4 retardation film 520, and a polarizing plate 530 for each cameral 410. The light source 420, the polarizing plate 510, the marker sheet 440, the λ/4 retardation film 520, and the polarizing plate 530 are disposed in at least an image pickup area of the camera 410, and disposed in this order toward the punching machine 360.

The retardation film 500 is disposed between the polarizing plate 510 and the marker sheet 440. For example, the light source 420 and the polarizing plate 510 are fixed just below the retardation film 500, for example, just below the alignment mark region 500B of the retardation film 500. For example, the marker sheet 440, the λ/4 retardation film 520, and the polarizing plate 530 move together with the camera 410 and the punching machine 360 in a direction orthogonal to an extending direction (moving direction) of the retardation film 500. For example, the marker sheet 440, the λ/4 retardation film 520, and the polarizing plate 530 are fixed on a lens (not shown) of the camera 410.

The polarizing plate 510 transmits a polarization component, for example, in a zero-degree direction. The λ/4 retardation film 520 has a slow axis, for example, in a 45-degree direction. The polarizing plate 530 transmits a polarization component, for example, in a 90-degree direction.

The manufacturing equipment having such a configuration is used to form a retardation film according to the comparative example. Specifically, first, the retardation film 500 is unwound from an unwinding roll 350 and moves in an extending direction of the retardation film 500. Concurrently, each camera 410 is allowed to scan in a direction orthogonal to the extending direction of the retardation film 500.

Figure 12:
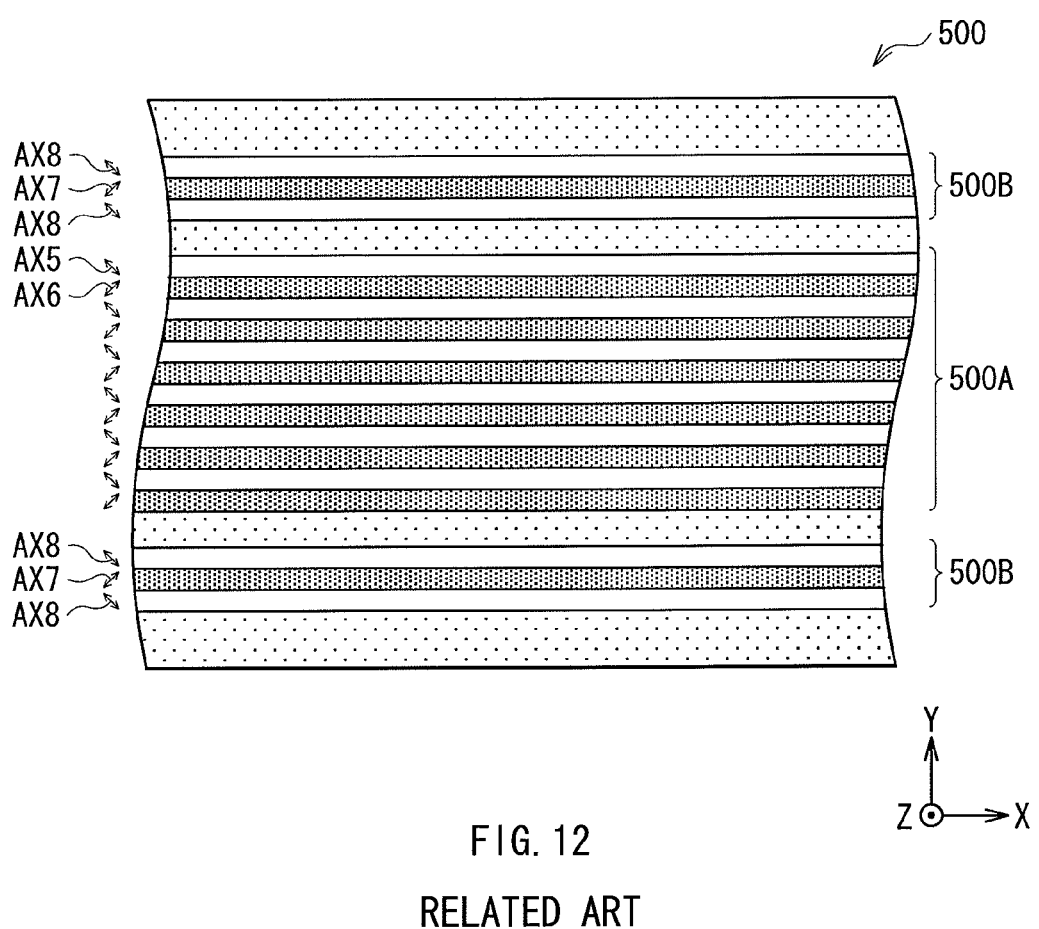
FIG. 12 is a diagram illustrating an example of a black-and-white pattern observed when the retardation film is viewed from above in a manufacturing process of the retardation film according to the comparative example.

Here, each camera 410 may detect an image of the retardation film 500, for example, an image as shown in FIG. 12. Specifically, black stripes and white stripes are mixed not only in the alignment mark region 500B but also in the patterned retardation region 500A. Thus, when each camera 410 is allowed to scan not only in the alignment mark region 500B but also in the patterned retardation region 500A, whether a detected boundary is in the alignment mark region 500B or in the patterned retardation region 500A is hardly distinguished. Therefore, in the comparative example, a scan range of each camera 410 needs to be prevented from ranging over the patterned retardation region 500A. To achieve this, the alignment mark region 500B needs to be formed away from the patterned retardation region 500A, or the retardation film 500 and the punching machine 360 need to be initially aligned to each other in certain accuracy. In the comparative example, it is therefore necessary to satisfy the above precondition in order to form the retardation film according to the comparative example from the retardation film 500.

On the other hand, in the embodiment, the alignment mark region 10B is different in retardation characteristic from the patterned retardation region 10A, and therefore each camera 410 may limitedly detect a black-and-white stripe in the alignment mark region 10B as a black-and-white stripe in an image of the retardation film 10'. This eliminates need of formation of the alignment mark region 10B away from the patterned retardation region 10A, or need of initial alignment of the retardation film 10' to the punching machine 360 in certain accuracy. In the embodiment, it is therefore possible to reduce a gap between the patterned retardation region 10A and the alignment mark region 10B, leading to reduction in waste of the film, and furthermore, the retardation film 10 may be accurately manufactured by a simple method.

Moreover, in the past, since each alignment mark is formed by printing or the like on a retardation film before punching, or a retardation region is formed in a film with marks, the retardation region is formed in a separate step from formation of the alignment mark. It is therefore necessary to perform accurate positioning of one while recognizing a position of the other in order to improve alignment accuracy. This has disadvantageously resulted in a complicated manufacturing process or increase in number of steps.

On the other hand, in the embodiment, irregularities of both the patterned retardation region 10A and the alignment mark region 10B of the retardation film 10 are collectively formed by transfer using the roll master 100. Both irregularities are thus formed in one step in the embodiment. This eliminates need of accurate positioning of one of the regions 10A and 10B while recognizing a position of the other. As a result, alignment accuracy may be improved with a simple method and in a small number of steps.

Figure 13:
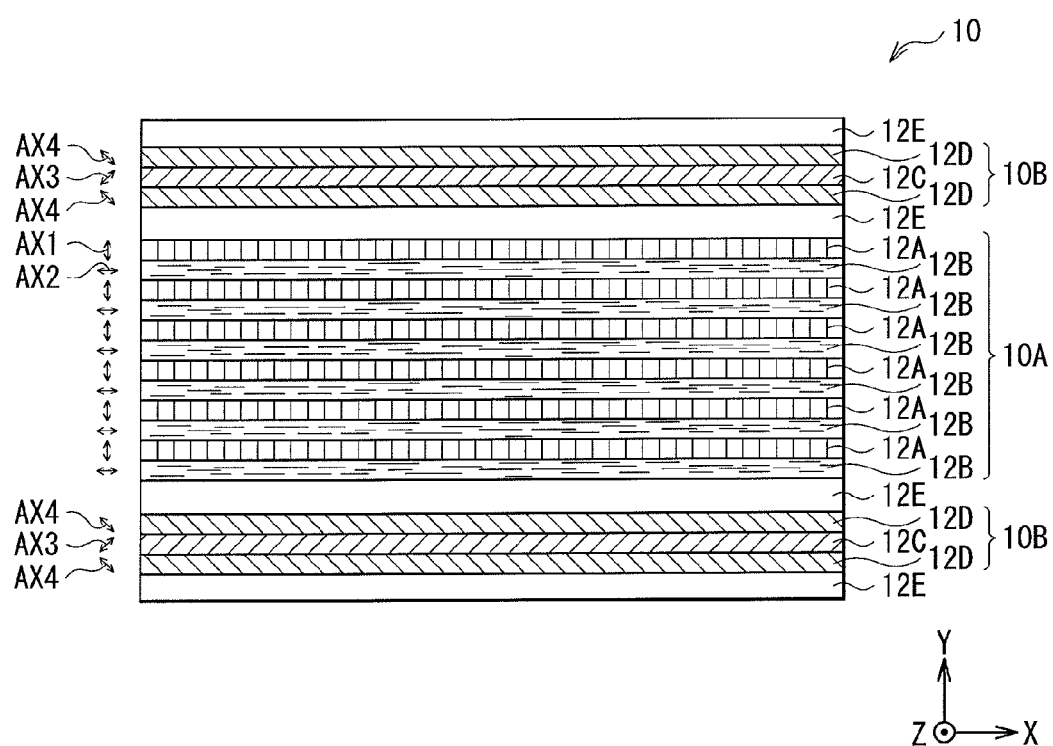
FIG. 13 is a diagram illustrating another example of a top configuration of the retardation film of FIG. 1.

For example, even if the respective slow axes AX1 to AX4 of the patterned retardation region 10A and the alignment mark region 10B are in directions different from those in the figures shown in the embodiment as illustrated in FIG. 13, the same advantage as in the above is obtained.

2. Application Example

Figure 14:
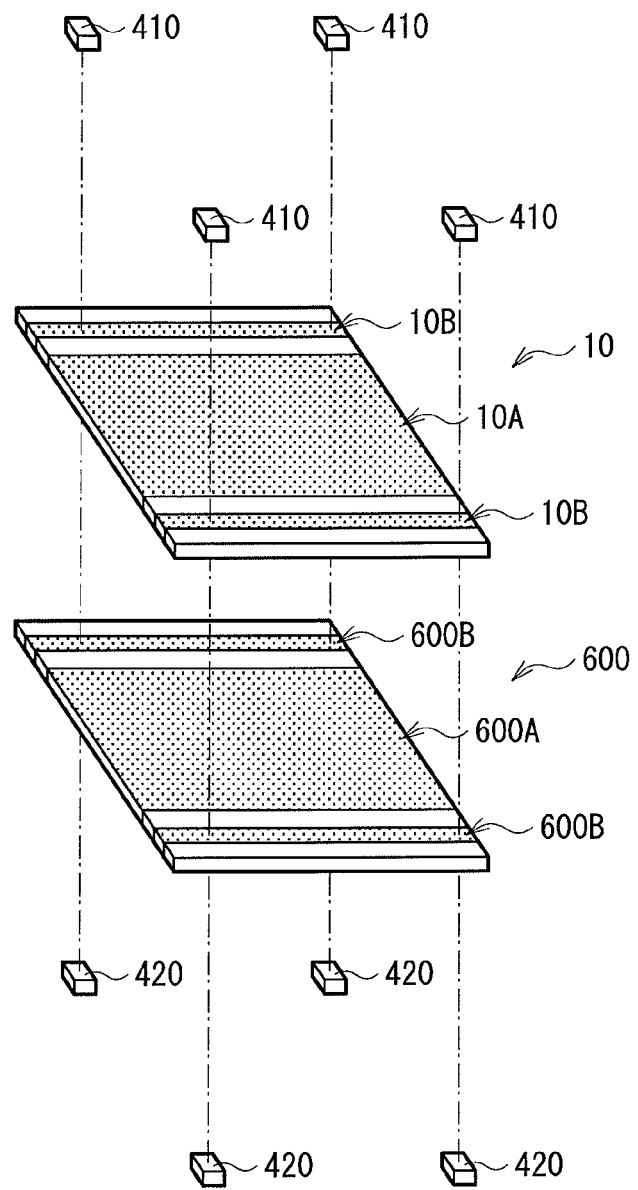
FIG. 14 is a diagram illustrating an example of a method of attaching a black stripe film to the retardation film of FIG. 1.
Figure 15:
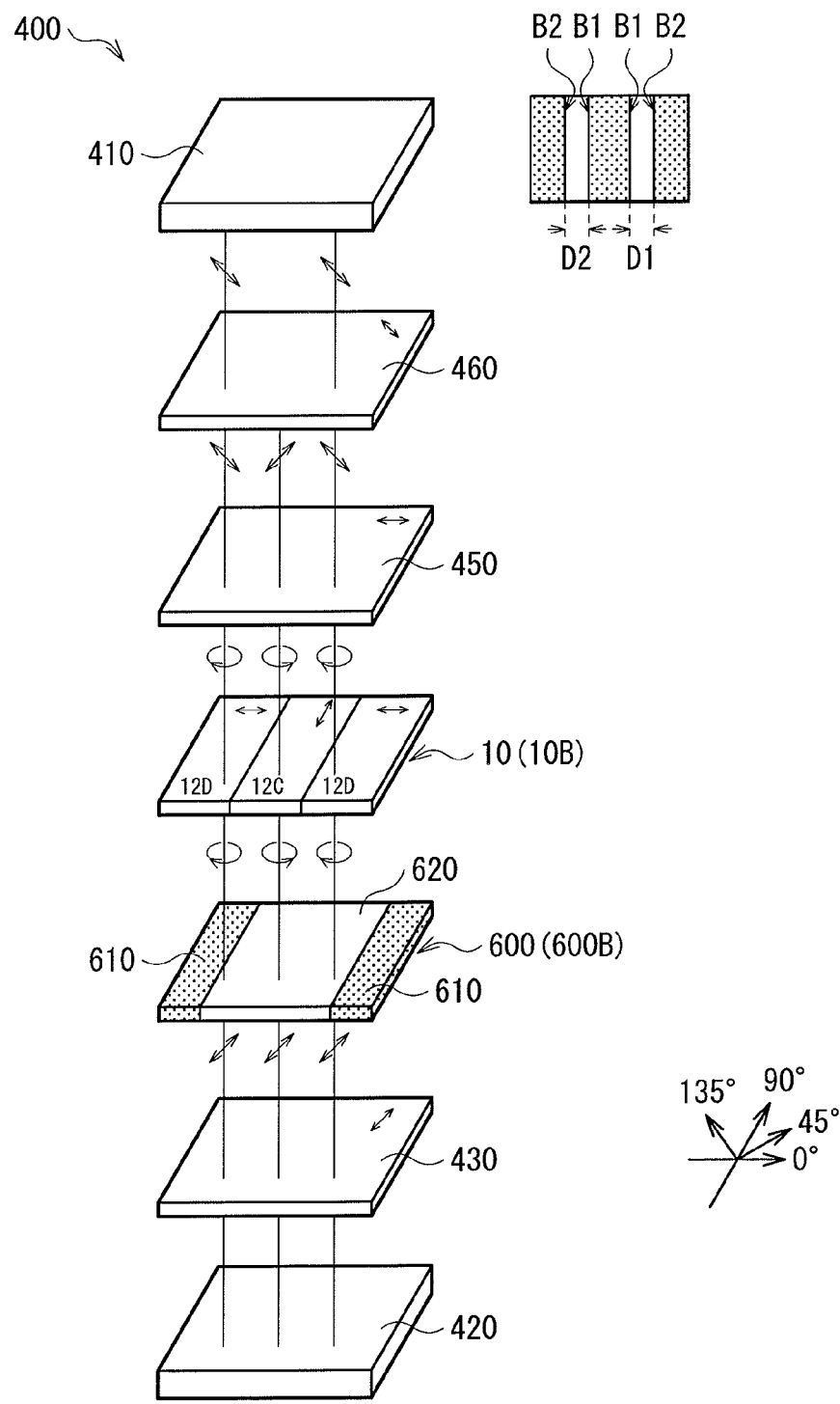
FIG. 15 is a diagram explaining a position detection system in the manufacturing method of FIG. 13.

For example, the detector 400 in the embodiment may be applied to attaching the retardation film 10 to a black stripe film 600 as shown in FIGS. 14 and 15.

FIG. 14 schematically illustrates an attachment of the retardation film 10 to the black stripe film 600. FIG. 15 illustrates an example of a configuration necessary for applying the detector 400 to attachment of the retardation film 10 to the black stripe film 600.

The black stripe film 600 reduces crosstalk that may occur when the retardation film 10 is used for 3D display, and, for example, has a black stripe region 600A and an alignment mark region 600B as shown in FIG. 14. The black stripe region 600A is disposed at a position opposed to a display pixel region when the black stripe film 600 is applied to 3D display.

The black stripe region 600A has black stripes (not shown) in regions opposed to boundaries between the retardation regions 12A and 12B when the retardation film 10 is used for 3D display. The alignment mark region 600B has a mark surrounding region 620 having width wider than width of the mark region 12C of the retardation film 10 and a pair of mark regions 610 provided on both sides of the mark surrounding region 620. The mark region 610 has a light-blocking property, and each mark surrounding region 620 has a light-transmitting property. In the alignment mark region 600B, at least the mark surrounding region 620 is configured of a material substantially free from retardation.

The detector 400 having such a configuration is used for attaching the retardation film 10 to the black stripe film 600. Specifically, first, the retardation film 10 and the black stripe film 600 are disposed at predetermined positions. Next, for example, each camera 410 is allowed to scan in a direction orthogonal to the extending direction of the alignment mark region 10B of the retardation film 10, together with the retardation film 10, and thus, for example, an image pickup area of each camera 410 traverses a region including the alignment mark region 10B of the retardation film 10 and edges of the patterned retardation region 10A of the retardation film 10.

Here, each camera 410 may detect an image of the retardation film 10, for example, the same image as an image of the retardation film 10' as shown in FIG. 9. Specifically, the mark region 12C of the alignment mark region 10B is black, and the mark surrounding region 12D thereof is white. In addition, the retardation film 10 is gray outside the alignment mark regions 10B. This leads to high contrast at a boundary between each mark region 12C and each mark surrounding region 12D, and low contrast in other portions. Accordingly, (two) boundaries B1 between the mark region 12C and the mark surrounding regions 12D, (two) boundaries B2 between a mark region 441 and mark surrounding regions 442, and distances D1 and D2 between the boundaries B1 and B2 are detected from an image captured during scan of each camera 410 in the direction orthogonal to the extending direction of the alignment mark region 10B of the retardation film 10 (see an upper right figure of FIG. 15). Here, for example, a position of the retardation film 10, at which the distances D1 and D2 derived from the image captured by each camera 410 are equal or approximately equal to each other, is derived. A position obtained in this way is set as an optimum position of the retardation film 10, and the retardation film 10 is disposed at the optimum position. Then, the retardation film 10 is pressed to the black stripe film 600, and thus the retardation film 10 is attached to the black stripe film 600. In this way, the retardation film 10 is attached to the black stripe film 600.

For example, when each camera 410 is allowed to scan together with the black stripe film 600 in the direction orthogonal to the extending direction of the alignment mark region 10B of the retardation film 10, for example, a position of the black stripe film 600, at which the distances D1 and D2 derived from the image captured by each camera 410 are equal or approximately equal to each other, is derived.

In the application example, a retardation characteristic of the alignment mark region 10B is different from that of the patterned retardation region 10A, and therefore each camera 410 may limitedly detect a black-and-white stripe in the alignment mark region 10B as a black-and-white stripe in an image of the retardation film 10. This eliminates need of formation of the alignment mark region 10B away from the patterned retardation region 10A, or need of initial alignment of the retardation film 10 to the black stripe film 600 in certain accuracy. In the application example, it is therefore possible to reduce a gap between the patterned retardation region 10A and the alignment mark region 10B, leading to reduction in waste of the film, and furthermore the retardation film 10 may be accurately attached to the black stripe film 600 by a simple method.

3. Second Embodiment

Configuration of Retardation Film 20

Figure 16:
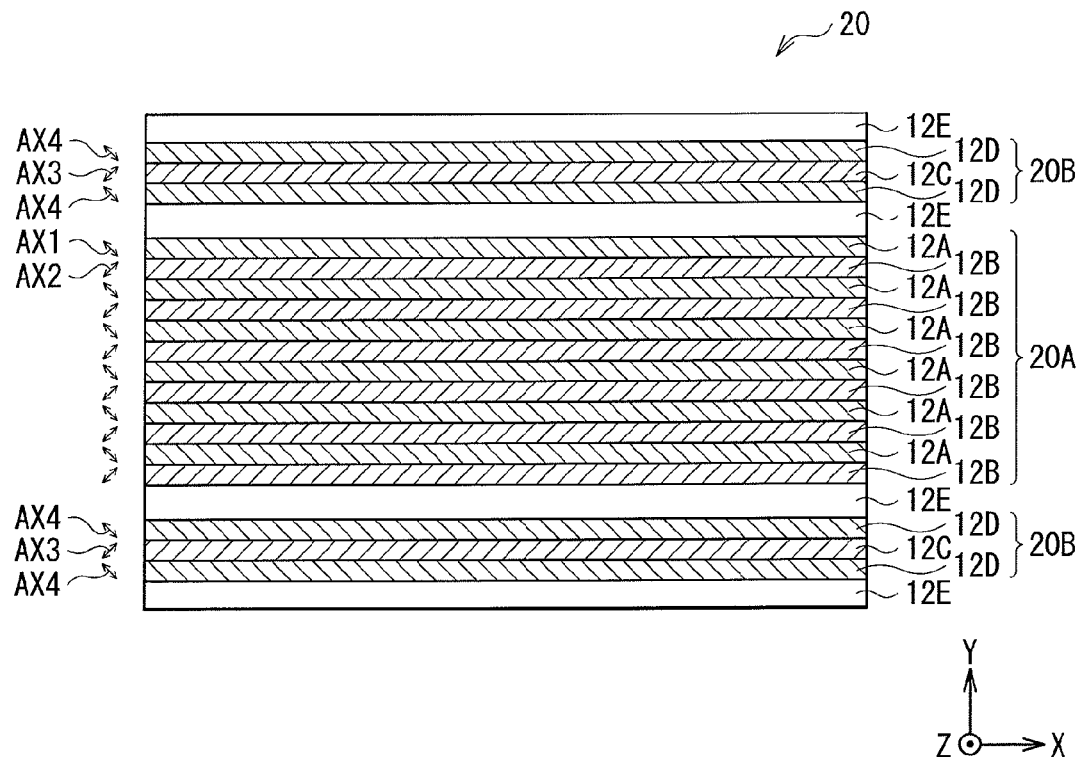
FIG. 16 is a diagram illustrating an example of a top configuration of a retardation film according to a second embodiment.
Figure 17:
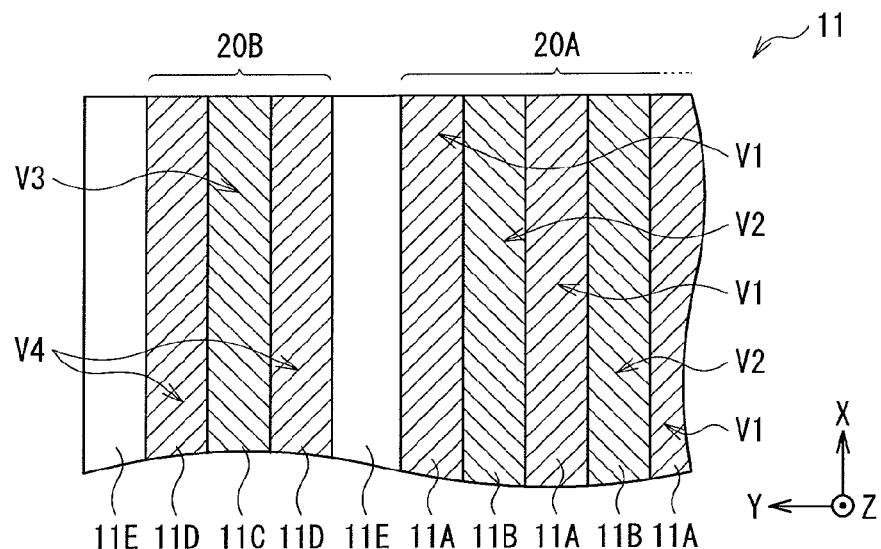
FIG. 17 is a diagram illustrating an example of a top configuration of a substrate in the retardation film of FIG. 16.

FIG. 16 illustrates an example of a top configuration of a retardation film 20 according to a second embodiment. FIG. 17 illustrates an example of a top configuration of a substrate 11 in the retardation film 20 of FIG. 16. The retardation film 20 has a patterned retardation region 20A disposed at a position opposed to a display pixel region when the retardation film 20 is used for 3D display, and an alignment mark region 20B disposed along an edge of the patterned retardation region 20A.

A top of the retardation film 20 has a flat region (non-alignment region 12E) in which the patterned retardation region 20A and the alignment mark region 20B are not formed. For example, the flat region is formed between the patterned retardation region 20A and the alignment mark region 20B as shown in FIG. 16.

The retardation film 20 includes, for example, the substrate 11 and a retardation layer 12 formed in contact with a surface of the substrate 11. The substrate 11 has groove regions 11A and 11B in a surface in the patterned retardation region 20A, and has groove regions 11C and 11D in the surface in the alignment mark region 20B. A flat region (flat region 11E), in which the patterned retardation region 20A and the alignment mark region 20B are not formed, is also provided in the top surface of the substrate 11. For example, the flat region 11E is formed between the patterned retardation region 20A and the alignment mark region 20B.

In the embodiment, extending directions of grooves V3 and V4 in the groove regions 11C and 11D are equal to extending directions of grooves V1 and V2 in the groove regions 11A and 11B, respectively. Furthermore, a retardation characteristic of a mark region 12C and a retardation characteristic of a mark surrounding region 12D are equal to retardation characteristics of retardation regions 12A and 12B, respectively. Slow axes AX1 and AX2 are, for example, orthogonal to each other, and slow axes AX3 and AX4 are, for example, orthogonal to each other. Furthermore, the slow axes AX3 and AX4 are in the same directions as the slow axes AX1 and AX2, for example, in such a manner that the slow axis AX3 is in the same direction as the slow axis AX2, and the slow axis AX4 is in the same direction as the slow axis AX1. For example, retardation of the mark region 12C is equal to retardation (for example, $+\lambda/4$) of the retardation region 12B, and retardation of the mark surrounding region 12D is equal to retardation (for example, $-\lambda/4$) of the retardation region 12A. The mark region 12C and the mark surrounding region 12D preferably have the same absolute value of retardation.

Method of Manufacturing Substrate 11

Next, an example of a method of manufacturing a master for manufacturing the substrate 11 of the embodiment will be described.

Figure 18A:
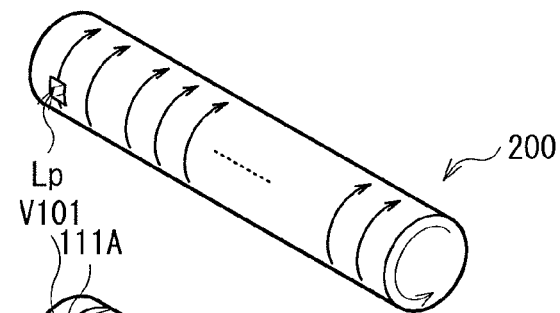
FIGS. 18A to 18C are diagrams explaining an example of a method of manufacturing a roll master used for manufacturing the substrate of FIG. 17.
Figure 18B:
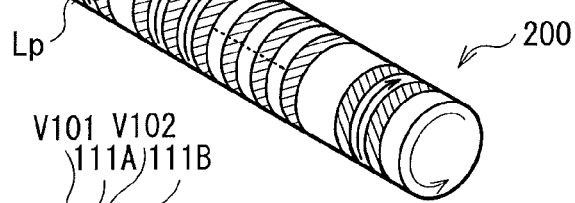
Figure 18C:
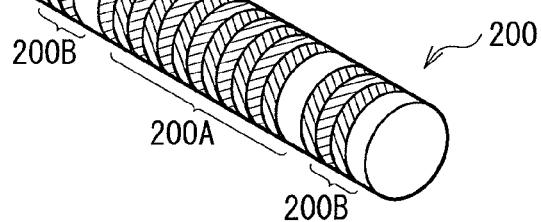

FIGS. 18A to 18C illustrate an example of a procedure for drawing a pattern on a roll master 200. For example, the roll master 200 is configured of metal such as stainless steel, Ni, Cu, Al, or Fe. Ultrashort pulse laser having a pulse width of 1 picosecond (10-12 second) or less, so-called femtosecond laser, is used for pattern drawing. Laser conditions are the same as those described in the first embodiment.

First, a circumferential surface of the roll master 200 is irradiated with laser light having a predetermined polarization direction while the roll master 200 is rotated (FIG. 18A). This results in formation of groove regions 111A (for example, corresponding to a reverse pattern of the groove regions 11A and 11D) on the roll master 200, each groove region 111A including a plurality of grooves V101 extending in a direction orthogonal to the polarization direction (FIG. 18B). Next, the polarization direction is rotated by 90 degrees, and the circumferential surface of the roll master 200 is irradiated with laser light having a polarization direction different by 90 degrees from the previous polarization direction while the roll master 200 is rotated (FIG. 18B). This results in formation of groove regions 111B (for example, corresponding to a reverse pattern of the groove regions 11B and 11C) on the roll master 200, each groove region 111B including a plurality of grooves V102 extending in a direction orthogonal to the polarization direction (FIG. 18C). As a result, a main region 200A is formed, in which two kinds of groove regions 111A and 111B having different extending directions of grooves are alternately disposed, and sub regions 200B are formed, in each of which the groove region 111B is sandwiched by a pair of groove regions 111A (FIG. 18C). Here, each sub region 200B is configured of the groove regions 111A and 111B having the same extending directions of grooves as extending directions of grooves in the main region 200A.

A subsequent manufacturing process of the retardation film 20 is the same as a manufacturing process of the retardation film 10 in the first embodiment. A formation order of the grooves V101 to V104 is not limited to the above, and other orders may be used.

Advantage

In the embodiment, irregularities of both the patterned retardation region 20A and the alignment mark region 20B of the retardation film 20 are collectively formed by transfer using the roll master 200. Both irregularities are thus formed in one step in the embodiment. This eliminates need of accurate positioning of one of the regions 20A and 20B while recognizing a position of the other. As a result, alignment accuracy may be improved with a simple method and in a small number of steps.

For example, even if the respective slow axes AX1 to AX4 of the patterned retardation region 20A and the alignment mark region 20B are in directions different from those in the figures shown in the embodiment, the same advantage as in the above is obtained.

The detector 400 in the application example of the first embodiment may be also used for attaching the retardation film 20 of the embodiment to a black stripe film 600.

While the application has been described with the embodiments and the application example hereinbefore, the embodiments and the like are not limitative, and various modifications or alterations may be made.

While the detector 400 has been illustratively used for punching of the retardation film 10' or for alignment in attaching the retardation film 10 or 20 to the black stripe film 600 in the embodiments and the like, the detector 400 may be used for, for example, alignment in attaching the retardation film 10 or 20 to a liquid crystal panel (not shown).

Moreover, for example, while a pair of mark surrounding regions 12D have been provided in the alignment mark region 10B in the embodiments and the like, at least one of the pair of mark surrounding regions 12D may be omitted. Moreover, while a pair of groove regions 11D have been provided in the alignment mark region 10B in the embodiments and the like, at least one of the pair of groove regions 11D may be flat.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A method of manufacturing a retardation film comprising:
    a first step of forming, on the same metal master, a main region having several kinds of groove regions having different extending directions of grooves, and a sub region having one kind of groove region having a predetermined extending direction of grooves or several kinds of groove regions having different extending directions of grooves; and
    a second step of collectively transferring reverse patterns of the main and sub regions on the metal master to a base, and then forming, on a surface of the base, a layer including an alignable material to be aligned in correspondence to irregularity of the surface of the base, thereby forming a patterned retardation region in a site having a reverse pattern of the main region, and forming an alignment mark region in a site having a reverse pattern of the sub region.

2. The method of manufacturing a retardation film according to claim 1,
    wherein the sub region is configured of groove regions having extending directions of grooves different from the extending directions of grooves in the main region.

3. The method of manufacturing a retardation film according to claim 1,
    wherein the sub region is configured of groove regions having the same extending directions of grooves as the extending directions of grooves in the main region.

4. The method of manufacturing a retardation film according to claim 1,
    wherein the base includes an uncured energy-curing resin layer formed on a surface of a flexible film, and
    the reverse patterns of the main and sub regions on the metal master are transferred to the energy-curing resin layer in the second step.

5. The method of manufacturing a retardation film according to claim 1,
    wherein the base is configured of a flexible single-layer film or a flexible multilayer film, and
    the reverse patterns of the main and sub regions on the metal master are thermally transferred to a surface of the base in the second step.

6. The method of manufacturing a retardation film according to claim 1,
    wherein a surface of the metal master is irradiated with ultrashort pulse laser to form the main and sub regions in the first step.

* * * * *